United States Patent [19]

Weaver et al.

[11] 4,444,684
[45] Apr. 24, 1984

[54] AZO DYES CONTAINING A DIAZOTIZED 5-AMINO ISOTHIAZOL MOIETY HAVING THEREON A SULFONIC ACID OR SALT GROUP

[75] Inventors: Max A. Weaver, Kingsport; Bill A. Eller, Gray, both of Tenn.

[73] Assignee: Eastman Kodak Company, Rochester, N.Y.

[21] Appl. No.: 345,989

[22] Filed: Feb. 5, 1982

[51] Int. Cl.$^3$ .................. C09B 29/039; C09B 29/09; C09B 29/36; C09B 29/44
[52] U.S. Cl. .................................... 260/155; 260/141; 260/158
[58] Field of Search ............................... 260/155, 158

[56] References Cited
U.S. PATENT DOCUMENTS 3,143,540 8/1964 Meen et al. .................... 260/155
4,330,467 5/1982 Fleischer et al. ............... 260/155

Primary Examiner—Floyd D. Higel
Attorney, Agent, or Firm—Donald W. Spurrell; Daniel B. Reece, III

[57] ABSTRACT

This invention relates to azo dyes in which the diazotized amino component bears a sulfonic acid or salt group on its ring. These dyes have excellent dyeing properties on polyamide fibers, particularly nylon carpets and also impart color to cellulose acetate fibers and wool.

The dyes correspond to the general formula:

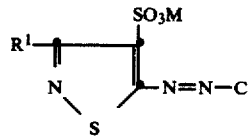

wherein $R^1$ is selected from hydrogen and alkyl; M is $H^+$, $Na^+$, $K^+$, $Li^+$ or $NH_4^+$; and the coupler C is selected from a variety of couplers including anilines, tetrahydroquinolines, phenols, and the like which may be substituted with known substituents such as halogen, alkyl, alkoxy, acylamido, sulfamoyl, carbamoyl and the like.

15 Claims, No Drawings

AZO DYES CONTAINING A DIAZOTIZED 5-AMINO ISOTHIAZOL MOIETY HAVING THEREON A SULFONIC ACID OR SALT GROUP

This invention concerns novel dyes in which the diazo moiety contains a sulfonic acid or salt group. These dyes are substantially water soluble and are particularly useful for dyeing polyamide, wool and the like, and exhibit excellent properties, including fastness to light and dyeability.

The dyes of this invention correspond to he general formula:

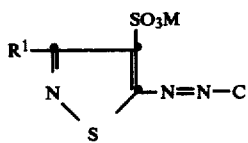

wherein $R^1$ is hydrogen or alkyl; M is $H^+$, $Na^+$, $Li^+$, $K^+$ or $NH_4^+$; and C is any of a variety of couplers as defined below.

More particularly, the dyes are of the above formula wherein the coupler C is selected from those having the formulas

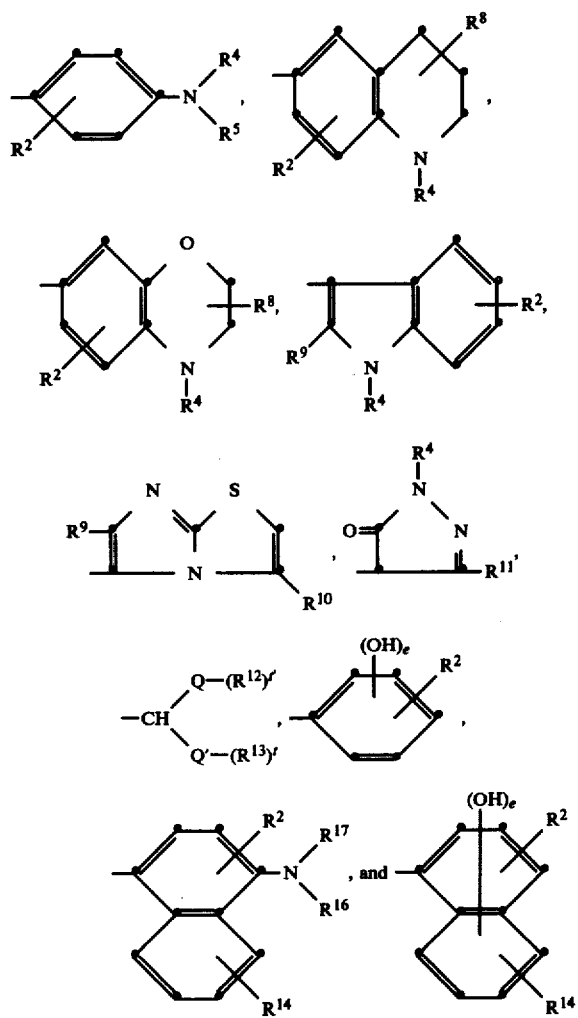

wherein $R^2$ and $R^{14}$ each represents up to three groups selected from hydrogen, fluorine, chlorine, bromine, alkyl, cycloalkyl, alkoxy, phenoxy, alkylthio, arylthio, and radicals having the formula $-NH-X-R^3$ in which X is $-CO-$, $-COO-$, or $-SO_2-$ and $R^3$ is selected from alkyl and alkyl substituted with halogen, hydroxy, phenoxy, aryl, cyano, cycloalkyl, alkylsulfonyl, alkylthio, alkanoyloxy, and alkoxy, and when X is $-CO-$, $R^3$ also is selected from hydrogen, amino, alkylamino, alkylcarbamoyl, dialkylamino, arylamino, aryl, and furyl;

$R^4$ and $R^5$ are each selected from hydrogen, alkyl, aryl, cycloalkyl, and $R^4$ and $R^5$ together can be the single, combined group $-CH_2CH_2CH_2CH_2CH_2-$, $-CH_2CH_2OCH_2CH_2-$, $-CH_2CH_2-S-CH_2CH_2-$, or $-CH_2CH_2-SO_2-CH_2CH_2-$;

$R^8$ is one or two groups each selected from hydrogen, alkyl and alkyl substituted with $-CN$, alkoxy, alkoxycarbonyl, alkoxycarbonyloxy, phenyl, cyclohexoxy, $-OH$, $-Cl$ and Br;

$R^9$, $R^{10}$ and $R^{11}$ are each selected from hydrogen, alkyl, phenyl, or phenyl substituted with 1-3 groups selected from Cl, Br, alkyl or alkoxy, alkylthio, benzylthio, cyclohexylthio, phenylthio and substituted phenylthio;

Q and Q' are each selected from $-CO-$, $-SO_2$, or $-CN$; $R^{12}$ and $R^{13}$ are each selected from hydrogen; alkyl, hydroxyalkyl, alkoxy, alkoxycarbonylamino, trifluoromethyl, phenyl or phenyl substituted with 1-3 groups selected from Cl, Br, alkyl or alkoxy, alkoxycarbonylalkyl, cyanoalkyl, amino, haloalkyl, alkylamino, alkylthio, benzylthio, cyclohexylthio, phenylthio and substituted phenylthio; $R^{12}$ and $R^{13}$ may combine to form an alkylene bridge of 2 or 3 carbons, or to form an arylene or cycloalkylene radical of 5-6 carbons connecting Q and Q'; $R^{16}$ and $R^{17}$ are selected from hydrogen, cycloalkyl, aryl, alkyl, and alkyl substituted with alkoxy, hydroxy, alkoxyalkoxy, hydroxyalkoxy, carbamoyl, sulfamoyl, acylamido, or alkylsulfonyl, and aryl substituted with hydroxyalkyl; e is 1 or 2; and t and t' are each 1 or zero. It is noted that when t or t' is zero, the corresponding Q or Q' group is $-CN$;

Each of the aliphatic portions of the above alkyl, cycloaliphatic, alkoxy, alkanoyl and the like groups, as well as the aryl and aryloxy groups, may be substituted further with up to three of the following: hydroxy; halogen; cyano; succinimido; glutarimido; phthalimido; 2-pyrrolidono; cyclohexyl; phenyl or phenyl substituted with alkyl, alkoxy, halogen, alkanoylamino, cyano or alkoxycarbonyl; alkanoylamino; sulfamoyl; alkylsulfamoyl; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyl; alkoxycarbonyloxy;

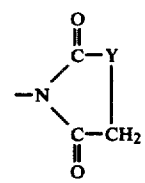

wherein Y is $-NH-$, $-NH-$alkyl$-$, $-O-$, $-S-$, or $-CH_2O-$; $-S-R^6$ wherein $R^6$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

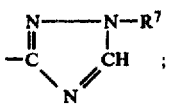

—OXR$^3$; —NH—X—R$^3$; —X—R$^3$; —CONR$^7$R$^7$; —SO$_2$NR$^7$R$^7$;

wherein R$^3$ and X are as defined above and each R$^7$ is selected from H and R$^3$; alkoxy; alkoxy substituted with hydroxy, cyano, alkanoyloxy, or alkoxy; phenoxy or phenoxy substituted with one or more of alkyl, alkoxy or halogen. All of the aliphatic portions of the various groups herein contain from 1-6 carbons, and are straight or branched chain.

The dyes of this invention impart yellow to violet shades on fibers, particularly polyamides, and are especially useful for dyeing polyamide (nylon) carpets, giving good fastness to light, ozone, oxides of nitrogen, washing, sublimation, crocking and the like, and having good leveling, transfer, exhaustion, and build properties. The dyes also resist shade change on carpets treated with insecticides such as Malathion.

The 5-amino-3-methylisothiazole-4-sulfonic acid is prepared according to the equation

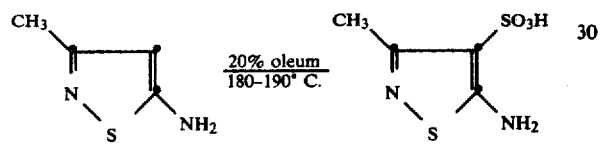

as disclosed in detail by D. L. Pain and E. W. Parnell, J. Chem. Soc. 1965, 7283.

The couplers used in this invention are prepared according to known procedures. The dyes may be prepared as follows:

Diazotization and Coupling of
5-Amino-3-methylisothiazole-4-sulfonic Acid

5-Amino-3-methylisothiazole-4-sulfonic acid (9.7 g., 0.05 m) was added to 150 ml of 60% aqueous acetic acid. Concentrated sulfuric acid (3.0 ml) was added and the mixture stirred at room temperature for 30 min. and then cooled to 0° C. A solution of nitrosyl sulfuric acid, prepared by adding 3.6 g. NaNO$_2$ to 25 ml of conc. H$_2$SO$_4$, was added at 0°-5° C. The diazotization reaction mixture was stirred at 0°-5° C. for 2 hrs. and coupled with the following couplers:

EXAMPLE 1

3-Acetamido-N,N-diethylaniline

EXAMPLE 2

5-Acetamido-N-cyclohexyl-2-methylaniline

EXAMPLE 3

N-Ethyl-N-2-phthalimidoethyl-m-toluidine

EXAMPLE 4

2-Phenylindole

EXAMPLE 5

N-Ethyl-7-propionamido-1,2,3,4-tetrahydro-2,2,4,7-tetramethylquinoline

EXAMPLE 6

6-Phenylimidazo [2,1-b]-thiazole

EXAMPLE 7

N-3-Acetamidopropyl-1-naphthylamine

EXAMPLE 8

2,3-Dihydro-3,6-dimethyl-N-ethyl-1,4-benzoxazine

EXAMPLE 9

N,N-Dibenzyl-m-toluidine

EXAMPLE 10

N-(2-Carbamylethyl)-2-phenylindole

The above couplers (0.005 m each) were dissolved in 15-25 ml of 1:5 acid (1 part propionic:5 parts acetic acid) and the solutions chilled in an ice-bath. A 0.005 m aliquot of the previously prepared diazoninium solution was added to each coupler. Sodium acetate was added to a pH of about 3.5. After allowing to stand for about 2 hrs., the coupling mixtures were diluted with saturated NaCl solution to a total volume of about 400 ml. The dyes were collected by filtration, washed with saturated NaCl solution and dried in air. The dyes were dyed on nylon carpet and produced orange to violet shades having good lightfastness.

This invention will be further illustrated by the following examples although it will be understood that these examples are included merely for purposes of illustration and are not intended to limit the scope of the invention. The compounds listed in the tables below can be prepared by procedures well known to the art.

TABLE 1

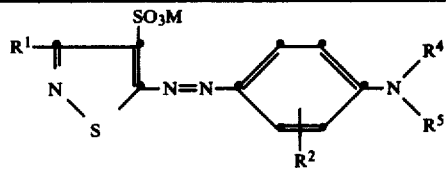

| R$^1$ | R$^2$ | R$^4$ | R$^5$ | M |
|---|---|---|---|---|
| H | H | C$_2$H$_5$ | C$_2$H$_4$NHCOCH$_3$ | Na |
| H | H | C$_2$H$_5$ | C$_3$H$_7$—n | " |
| H | H | " | C$_2$H$_5$ | Na |
| CH$_3$ | H | CH$_3$ | C$_2$H$_4$SO$_2$CH=CH$_2$ | H |
| CH$_3$ | H | C$_2$H$_4$OH | C$_2$H$_4$CN | K |
| CH$_3$ | 3-CH$_3$ | C$_2$H$_5$ | C$_2$H$_4$CN | Na |
| C$_4$H$_9$—n | 3-CH$_3$ | C$_2$H$_4$OH | C$_2$H$_4$OH | Na |
| C$_4$H$_9$—n | 2-CH$_3$—3-Cl | H | CH$_2$C$_6$H$_5$ | K |
| C$_4$H$_9$—n | 3-Cl | C$_6$H$_{11}$ | C$_2$H$_5$ | K |
| C$_4$H$_9$—n | 3-NHCOCH$_3$ | C$_2$H$_5$ | C$_2$H$_4$CN | Na |

TABLE 1-continued

| R¹ | R² | R⁴ | R⁵ | M |
|---|---|---|---|---|
| C₄H₉—n | " | " | C₂H₄CONH₂ | K |
| C₄H₉—n | 2-CH₃ | H | C₂H₄SO₂NH₂ | Na |
| C₄H₉—n | 2-OC₆H₅ | C₂H₄CN | C₂H₄N(COCH₃)₂ | H |
| C₄H₉—n | 3-SCH₃ | C₂H₄OCOCH₃ | C₂H₄SO₂NHC₂H₅ | K |
| C₄H₉—n | 3-CH₃ | C₂H₅ | C₂H₄OCOCH₃ | Na |
| C₂H₅ | 3-SC₆H₅ | | C₂H₄SO₂NHC₂H₅ | K |
| C₂H₅ | 3-NHCOOCH₃ | C₂H₄OH | C₂H₄OH | Na |
| C₂H₅ | 3-NHSO₂CH₃ | C₂H₅ | C₂H₄CN | Na |
| C₂H₅ | 2-OCH₃, 5-NHCOCH₃ | C₂H₄OCOCH₃ | C₂H₄OCOCH₃ | NH₄ |
| C₂H₅ | 3-NHCOCH₂Cl | C₂H₄OH | C₆H₁₁ | K |
| C₂H₅ | 3-NHCOC₂H₄OH | H | C₂H₄OH | K |
| C₂H₅ | 2-CH₃, 3-Cl | H | CH₂C₆H₅ | K |
| C₂H₅ | 2-NHCONHC₂H₅ | C₂H₄OH | C₂H₄CN | NH₄ |
| C₂H₅ | 2-NHCON(C₂H₅)₂ | C₂H₅ | C₂H₅ | K |
| C₃H₇—n | 3-CH₃ | C₂H₅ | C₂H₄NHCOCH₃ | H |
| C₃H₇—n | 3-NHCOCH₃ | " | C₂H₄CONH₂ | H |
| C₃H₇—n | H | " | C₂H₄NHCOCH₃ | Na |
| CH₃ | H | —CH₂CH₂—O—CH₂CH₂— | | Na |
| CH₃ | H | —CH₂CH₂—S—CH₂CH₂— | | Na |
| CH₃ | H | —CH₂CH₂—SO₂—CH₂CH₂— | | Na |
| CH₃ | H | —CH₂CH₂—NH—CH₂CH₂— | | Na |
| CH₃ | H | —CH₂CH₂—N(COCH₃)—CH₂CH₂— | | Na |

TABLE 2

| R¹ | R² | R⁸ | R⁴ | M |
|---|---|---|---|---|
| H | 7-CH₃ | 2-CH₃ | C₂H₅ | K |
| H | " | " | CH₂C₆H₅ | " |
| H | H | 2,2,4-(CH₃)₃ | C₂H₅ | Na |
| CH₃ | H | " | C₂H₅ | Na |
| CH₃ | H | " | CH₂C₆H₄—p-COOCH₃ | Na |
| CH₃ | 7-CH₃ | 2-CH₃ | C₂H₄NHCOCH₃ | H |
| C₄H₉—n | 7-NHCOCH₃ | H | C₂H₄OH | K |
| C₄H₉—n | " | " | C₂H₄OC₂H₅ | Na |
| C₄H₉—n | 5-CH₃ | " | " | K |
| C₄H₉—n | 8-CH₃ | " | C₂H₄OCH₃ | NH₄ |
| C₄H₉—n | 7-CH₃ | 2,2,4-(CH₃)₃ | C₂H₅ | K |
| C₄H₉—n | " | " | C₂H₄Cl | K |
| C₄H₉—n | " | " | CH₂C₆H₁₁ | K |
| C₄H₉—n | 7-SC₆H₅ | " | C₂H₄SO₂NH₂ | K |
| C₄H₉—n | 7-NHCOOCH₃ | CH₃ | C₂H₄OH | Na |
| C₂H₅ | 7-NHSO₂CH₃ | 2-C₂H₅ | C₂H₄CN | Na |
| C₂H₅ | 7-OCH₃, 5-NHCOCH₃ | 3-OCOCH₃ | C₂H₄OCOCH₃ | NH₄ |
| C₂H₅ | 7-NHCOCH₂Cl | 3-OH | C₆H₁₁ | K |
| C₂H₅ | 7-NHCOC₂H₄OH | 3-CONH₂ | C₂H₄OH | K |
| C₂H₅ | 7-CH₃, 3-Cl | 3-Cl | CH₂C₆H₅ | K |
| C₂H₅ | 7-NHCONHC₂H₅ | 3-OC₆H₅ | C₂H₄CN | NH₄ |
| C₂H₅ | 7-NHCON(C₂H₅)₂ | " | C₂H₅ | K |
| C₂H₅ | 7-CH₃ | 3-SC₂H₅ | C₂H₄NHCOCH₃ | H |
| C₂H₅ | 7-NHCOCH₃ | 3-CONHC₂H₅ | C₂H₄CONH₂ | H |
| C₃H₇—n | H | 3-OCH₃ | C₂H₄NHCOCH₃ | Na |

TABLE 3

| R¹ | R² | R⁸ | R⁴ | M |
|---|---|---|---|---|
| H | H | H | $CH(CH_3)_2$ | K |
| H | H | H | $CH_2C_6H_5$ | K |
| H | 6-$CH_3$ | 3-$CH_3$ | $C_2H_5$ | Na |
| $CH_3$ | " | " | $C_2H_4OH$ | H |
| $CH_3$ | " | " | $C_2H_4SO_2NH_2$ | Na |
| $CH_3$ | " | " | $CH_2C_6H_4$—p-$COOCH_3$ | K |
| $C_4H_9$—n | " | " | $C_2H_4OCH_3$ | K |
| $C_4H_9$—n | 6-$NHCOCH_3$ | H | $C_2H_5$ | K |
| $C_4H_9$—n | " | 3-$CH_3$ | " | K |
| $C_4H_9$—n | " | 3-$CH(CH_3)_2$ | $C_2H_4OCH_3$ | Na |
| $C_4H_9$—n | " | " | $C_2H_5$ | K |
| $C_4H_9$—n | " | " | $C_2H_4OH$ | $NH_4$ |
| $C_4H_9$—n | " | " | $CH_2CH_2CONH_2$ | H |
| $C_4H_9$—n | 6-$NHCOOCH_3$ | 2-$CH_2OH$ | $C_2H_4OH$ | Na |
| $C_4H_9$—n | 6-$NHSO_2CH_3$ | " | $C_2H_4CN$ | Na |
| $C_2H_5$ | 5-$OCH_3$, 8-$NHCOCH_3$ | " | $C_2H_4OCOCH_3$ | $NH_4$ |
| $C_2H_5$ | 6-$NHCOCH_2Cl$ | 2-$CH_2CH_3$ | $C_6H_{11}$ | K |
| $C_2H_5$ | 6-$NHCOC_2H_4OH$ | H | $C_2H_4OH$ | K |
| $C_2H_5$ | 5-$CH_3$, 8-Cl | 2-$CH_2Cl$ | $CH_2C_6H_5$ | K |
| $C_2H_5$ | 6-$NHCONHC_2H_5$ | 2-$CH_2Cl$ | $C_2H_4CN$ | $NH_4$ |
| $C_2H_5$ | 6-$NHCON(C_2H_5)_2$ | 2-$CH_2OC_6H_5$ | $C_2H_5$ | K |
| $C_2H_5$ | 6-$CH_3$ | " | $C_2H_4NHCOCH_3$ | H |
| $C_2H_5$ | 6-$NHCOCH_3$ | 2-$C_2H_4OC_2H_5$ | $C_2H_4CONH_2$ | H |
| $C_2H_5$ | H | " | $C_2H_4NHCOCH_3$ | Na |

TABLE 4

| R¹ | R⁹ | R² | R⁴ | M |
|---|---|---|---|---|
| H | $C_6H_5$ | H | H | Na |
| H | " | " | $CH_3$ | Na |
| H | $CH_3$ | " | $C_2H_4OH$ | Na |
| $CH_3$ | $CH_3$ | " | $C_2H_4OCOCH_3$ | Na |
| $CH_3$ | " | 5-$CH_3$ | $CH_3$ | K |
| $CH_3$ | $C_6H_5$ | 5-Cl | H | " |
| $C_4H_9$—n | $C_6H_5$ | 5-$NHCOCH_3$ | $C_2H_4CN$ | H |
| $C_4H_9$—n | " | 5-$OCH_3$ | $CH_3$ | " |
| $C_4H_9$—n | " | H | $C_2H_4CONH_2$ | Na |
| $C_4H_9$—n | " | H | $C_2H_4NHCOCH_3$ | Na |
| $C_4H_9$—n | " | H | $C_3H_6NHCONHC_2H_5$ | Na |
| $C_4H_9$—n | $C_6H_5$ | H | $C_2H_5$ | Na |
| $C_4H_9$—n | $C_6H_5$ | H | $CH_3$ | Na |
| $C_4H_9$—n | $CH_3$ | 6-$CH_3$ | $CH_3$ | " |
| $C_4H_9$—n | $CF_3$ | " | $C_6H_5$ | " |
| $C_2H_5$ | $C_6H_5$ | H | $C_2H_5$ | H |
| $C_2H_5$ | $C_6H_5$ | H | H | Na |
| $C_2H_5$ | $CONH_2$ | " | $CH_3$ | " |
| $C_2H_5$ | $CH_3$ | " | $CH_3$ | " |
| $C_2H_5$ | Cl | 5-$OC_2H_5$ | " | " |
| $C_2H_5$ | $CH_3$ | " | H | " |
| $C_2H_5$ | $C_6H_4$—p-Br | H | H | " |
| $C_2H_5$ | $C_6H_5$ | " | $C_2H_4CONH_2$ | K |
| $C_2H_5$ | $C_6H_4$—p-$OCH_3$ | " | $C_2H_4CN$ | K |
| $C_2H_5$ | " | 6-$C_6H_{11}$ | $C_2H_4SO_2NH_2$ | " |
| $C_2H_5$ | " | 4-$OC_6H_5$ | $C_2H_4N(COCH_3)_2$ | " |
| $C_3H_7$—n | $C_2H_4CN$ | 5-$SCH_3$ | $C_2H_4SO_2NHC_2H_5$ | K |
| $C_3H_7$—n | $C_2H_4OCOCH_3$ | 5-$SC_6H_5$ | $C_2H_4SO_2NHC_2H_5$ | K |
| $CH_3$ | " | 5-$NHCOOCH_3$ | $C_2H_4OH$ | Na |

TABLE 4-continued

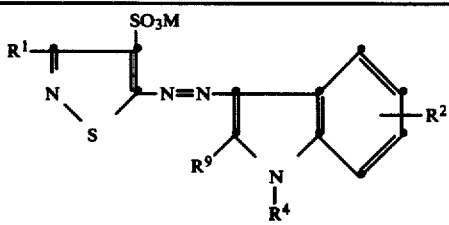

| R¹ | R⁹ | R² | R⁴ | M |
|---|---|---|---|---|
| CH₃ | C₃H₇ | 6-NHSO₂CH₃ | C₂H₄CN | Na |
| CH₃ | CH₃ | 6-OCH₃, 5-NHCOCH₃ | C₂H₄OCOCH₃ | NH₄ |
| CH₃ | C₂H₅ | 6-NHCOCH₂Cl | C₆H₁₁ | K |
| CH₃ | OH | 6-NHCOC₂H₄OH | C₂H₄OH | K |
| H | SO₂NH₂ | " | CH₂C₆H₅ | K |
| H | SO₂NHC₂H₅ | 6-NHCONHC₂H₅ | C₂H₄CN | NH₄ |
| H | OC₆H₁₁ | 6-NHCON(C₂H₅)₂ | C₂H₅ | K |
| CH₃ | SC₂H₅ | 6-CH₃ | C₂H₄NHCOCH₃ | K |
| CH₃ | CONHC₂H₅ | 6-NHCOCH₃ | C₂H₄CONH₂ | " |
| CH₃ | OCH₃ | H | C₂H₄NHCOCH₃ | Na |
| C₄H₉—n | NHOCC₂H₅ | " | " | " |
| C₄H₉—n | C₆H₄—p-CH₃ | 6-OH | " | H |

TABLE 5

| R¹ | R⁹ | R¹⁰ | M |
|---|---|---|---|
| H | C₆H₅ | H | Na |
| CH₃ | " | CH₃ | Na |
| CH₃ | CH₃ | C₆H₅ | Na |
| C₄H₉—n | C₆H₅ | H | NH₄ |
| C₄H₉—n | C₆H₅ | H | Na |
| C₄H₉—n | " | CH₃ | " |
| C₄H₉—n | " | H | H |
| C₂H₅ | CH₃ | " | Na |
| C₂H₅ | CH₃ | C₆H₅ | Na |
| C₂H₅ | C₆H₅ | CH₃ | Na |
| C₂H₅ | C₆H₅ | " | NH₄ |
| C₂H₅ | CH₃ | H | K |
| C₂H₅ | C₆H₄—p-Br | " | K |
| C₃H₇—n | C₆H₄—p-OCH₃ | " | K |
| C₃H₇—n | " | Br | K |
| C₃H₇—n | C₂H₄CN | " | K |
| CH₃ | C₂H₄OCOCH₃ | " | K |
| CH₃ | CONH₂ | C₂H₅ | K |
| CH₃ | SCN | C₂H₅ | K |
| CH₃ | SO₂C₂H₅ | C₆H₅ | K |
| CH₃ | OCOCH₃ | C₆H₄—p-CH₃ | K |
| H | CONHC₂H₅ | " | K |
| H | OH | H | K |
| H | SO₂NH₂ | CONHC₂H₅ | K |
| CH₃ | SO₂NHC₂H₅ | CH₃ | K |
| CH₃ | OC₆H₁₁ | C₂H₅ | K |
| CH₃ | SCN | SCN | K |
| C₄H₉—n | CONHC₂H₅ | CONH₂ | K |
| C₄H₉—n | OCH₃ | CH(CH₃)₂ | K |
| C₄H₉—n | NHOCC₂H₅ | C₆H₅ | K |
| C₄H₉—n | " | C₂H₅ | H |

TABLE 6

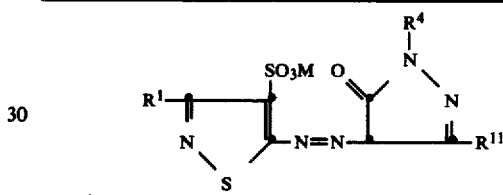

| R¹ | R⁴ | R¹¹ | M |
|---|---|---|---|
| H | H | CH₃ | K |
| H | H | C(CH₃)₃ | " |
| H | H | CF₃ | " |
| CH₃ | H | COOC₂H₅ | H |
| CH₃ | H | CONHC₂H₅ | Na |
| CH₃ | H | C₆H₅ | K |
| C₄H₉—n | C₆H₅ | CH₃ | " |
| C₄H₉—n | " | C(CH₃)₃ | NH₄ |
| C₄H₉—n | " | C₆H₅ | Na |
| C₄H₉—n | " | C₆H₉—p-OCH₃ | " |
| C₄H₉—n | C₆H₄—p-SO₂ | CH₃ | " |
| C₄H₉—n | CH₃SO₂ | " | " |
| C₄H₉—n | C₂H₅SO₂ | " | " |
| C₄H₉—n | H | CH₃ | K |
| C₄H₉—n | H | C₆H₄—p-OCH₃ | " |
| C₂H₅ | H | CF₃ | " |
| C₂H₅ | H | COOC₂H₅ | NH₄ |
| C₂H₅ | H | C₂H₅ | Na |
| C₂H₅ | H | C₆H₅ | K |
| C₂H₅ | C₆H₅ | C₆H₄—p-Br | " |
| C₂H₅ | " | C(CH₃)₃ | H |
| C₂H₅ | " | C₆H₁₁ | Na |
| C₂H₅ | " | C₆H₅ | Na |
| C₂H₅ | C₆H₅SO₂ | CH₃ | Na |
| C₂H₅ | C₂H₅SO₂ | " | K |
| C₃H₇—n | CH₃CO | " | K |
| C₃H₇—n | C₆H₅CO | CH₃ | K |
| C₃H₇—n | CH₃ | CONH₂ | K |
| CH₃ | C₂H₄OH | C₂H₅ | K |
| CH₃ | C₂H₄CN | " | K |
| CH₃ | C₂H₄OCOCH₃ | " | K |
| CH₃ | C₆H₁₁ | CF₃ | K |
| CH₃ | C₂H₄OH | C₆H₄—p-Cl | K |
| H | CH₂C₆H₅ | CONHC₂H₅ | K |
| H | C₂H₄CN | CH(CH₃)₂ | K |
| H | C₂H₅ | " | K |
| CH₃ | C₂H₄NHCO₂C₂H₅ | C₂H₅ | K |
| CH₃ | C₂H₄CONH₂ | CH₃ | K |
| CH₃ | C₂H₄NHCOCH₃ | C₂H₅ | K |
| C₄H₉—n | " | C₆H₅ | NH₄ |

TABLE 7

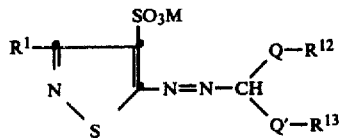

| R¹ | Q | Q' | R¹² | R¹³ | M |
|---|---|---|---|---|---|
| H | CO | CO | $C_6H_5$ | $C_6H_5$ | Na |
| H | CO | CO | $NH_2$ | $CH_3$ | " |
| H | CN | CO | — | $NHCO_2C_2H_5$ | K |
| $CH_3$ | CN | CO | — | $CH_2OH$ | Na |
| $CH_3$ | CN | CO | — | $CH_3$ | Na |
| $CH_3$ | CO | $SO_2$ | $NH_2$ | $OC_6H_5$ | Na |
| $C_4H_9-n$ | CO | $SO_2$ | $CH_2Cl$ | $OCH_3$ | Na |
| $C_4H_9-n$ | CN | $SO_2$ | — | $C_6H_5$ | Na |
| $C_4H_9-n$ | CO | CO | $-CH_2C(CH_3)_2CH_2-$ | | " |
| $C_4H_9-n$ | CO | CO | $1,2-C_6H_4-$ | | K |
| $C_4H_9-n$ | CO | CO | $C_2H_5$ | $OC_2H_5$ | K |
| $C_4H_9-n$ | CO | CO | $CH_3$ | $NH_2$ | K |
| $C_4H_9-n$ | CO | CO | $NHC_2H_5$ | $NH_2$ | K |
| $C_4H_9-n$ | CO | CO | $NHC_2H_5$ | $CH_3$ | K |
| $C_4H_9-n$ | CO | $SO_2$ | $NH_2$ | $C_2H_5$ | $NH_4$ |
| $C_2H_5$ | CO | CO | $SC_2H_5$ | $C_2H_5$ | K |
| $C_2H_5$ | CO | CO | $SCH_2-C_6H_5$ | $C_2H_5$ | K |
| $C_2H_5$ | CO | CO | $SC_6H_{11}$ | $OCH_3$ | K |
| $C_2H_5$ | CO | CO | $C_6H_5$ | $OCH_3$ | K |
| $C_2H_5$ | CO | CO | $NHCOC_2H_5$ | $NHCO_2C_2H_5$ | K |
| $C_2H_5$ | CO | CO | $NHSO_2C_2H_5$ | $NHCO_2C_2H_5$ | K |
| $C_2H_5$ | CO | CO | $NHCOC_6H_5$ | $NHCO_2C_2H_5$ | K |
| $C_2H_5$ | CO | CO | $OC_2H_5$ | $NHCO_2C_2H_5$ | $NH_4$ |

TABLE 8

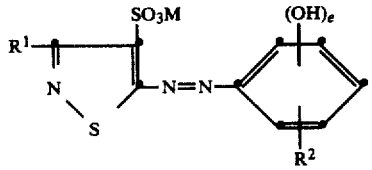

| R¹ | OH Position | R² | M |
|---|---|---|---|
| H | 2 | 5-Cl | Na |
| H | 2 | 5-Cl | Na |
| H | 2 | $5-OCH_3$ | Na |
| $CH_3$ | 3,4 | H | K |
| $CH_3$ | 2 | $5-OCH_3$ | Na |
| $CH_3$ | 2 | " | " |
| $C_4H_9-n$ | 2 | $5-CH_3$ | " |
| $C_4H_9-n$ | 3,4 | H | " |
| $C_4H_9-n$ | 2 | $5-OCH_3$ | K |
| $C_4H_9-n$ | 2 | " | $NH_4$ |
| $C_4H_9-n$ | 2 | $5-NHC_6H_5$ | Na |
| $C_4H_9-n$ | 2 | $5-NHCOCH_3$ | Na |
| $C_2H_5$ | 2 | $5-NHCOCH_3$ | " |
| $C_2H_5$ | 2 | $5-CH_3$ | Na |
| $C_2H_5$ | 2 | $5-OCH_3$ | K |
| $C_2H_5$ | 2 | 5-Cl | Na |
| $C_2H_5$ | 4 | $2-OCH_3$ | K |
| $C_2H_5$ | 3,4 | H | Na |
| $C_3H_7-n$ | 3,4 | H | Na |
| $C_3H_7-n$ | 2 | $3-NHCOCH_3$ | Na |
| $C_3H_7-n$ | 2 | " | K |
| $CH_3$ | 2 | $5-CONHC_2H_5$ | K |

TABLE 8-continued

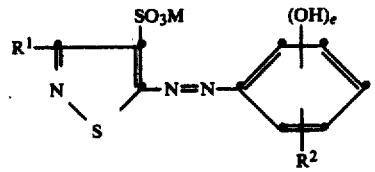

| R¹ | OH Position | R² | M |
|---|---|---|---|
| $CH_3$ | 2 | $5-C_6H_{11}$ | " |
| $CH_3$ | 2 | $5-OC_6H_5$ | $NH_4$ |
| $CH_3$ | 2 | $5-SCH_3$ | K |
| $CH_3$ | 2 | $5-SC_6H_5$ | K |
| H | 2 | $5-NHCOOCH_3$ | Na |
| H | 2 | $5-NHSO_2CH_3$ | Na |
| H | 2 | $5-NHCOCH_3$ | $NH_4$ |
| $CH_3$ | 2 | $5-NHCOCH_2Cl$ | K |
| $CH_3$ | 2 | $5-NHCOC_2H_4OH$ | K |
| $CH_3$ | 2 | 5-Cl | K |
| $C_4H_9-n$ | 2 | $5-NHCONHC_2H_5$ | $NH_4$ |
| $C_4H_9-n$ | 2 | $5-NHCON(C_2H_5)_2$ | K |
| $C_4H_9-n$ | 2 | $5-CH_3$ | " |
| $C_4H_9-n$ | 2 | $5-NHCOCH_3$ | " |
| $C_4H_9-n$ | 4 | H | Na |

TABLE 9

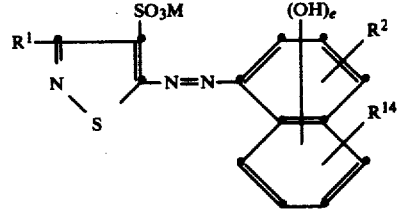

| R¹ | OH Position | R² | R¹⁴ | M |
|---|---|---|---|---|
| H | 2 | $3-CO_2CH_3$ | H | K |
| H | 4 | H | H | " |
| H | 4 | H | H | " |
| $CH_3$ | 4 | H | H | Na |
| $CH_3$ | 2 | H | H | K |
| $CH_3$ | 2 | $3-CONH_3$ | H | K |
| $C_4H_9-n$ | 2 | $3-CO_2CH_3$ | H | Na |
| $C_4H_9-n$ | 2 | H | $6-SO_2N(CH_3)_2$ | Na |
| $C_4H_9-n$ | 2 | " | $6-SO_2NHC_3H_6OCH_3$ | Na |
| $C_4H-n$ | 2 | " | $6-SO_2N(C_2H_5)_2$ | " |
| $C_4H_9-n$ | 2 | " | H | " |
| $C_4H_9-n$ | 4 | " | | " |
| $C_4H_9-n$ | 2 | $3-CONH_2$ | H | K |
| $C_2H_5$ | 2 | $3-CO_2CH_3$ | " | Na |
| $C_2H_5$ | 2 | H | " | $NH_4$ |
| $C_2H_5$ | 2 | $3-CO_2CH_2Cl$ | " | K |
| $C_2H_5$ | 2 | $3-CO_2C_2H_4OH$ | " | K |
| $C_2H_5$ | 4 | H | H | K |
| $C_2H_5$ | 2 | $3-CONHC_2H_5$ | " | $NH_4$ |
| $C_2H_5$ | 2 | $3-CON(C_2H_5)_2$ | " | K |
| $C_2H_5$ | 2 | $3-CO_2C_2H_5$ | " | " |
| $C_2H_5$ | 2 | $3-CO_2CH(CH_3)_2$ | " | " |
| $C_3H_7-n$ | 2 | H | " | " |

TABLE 10

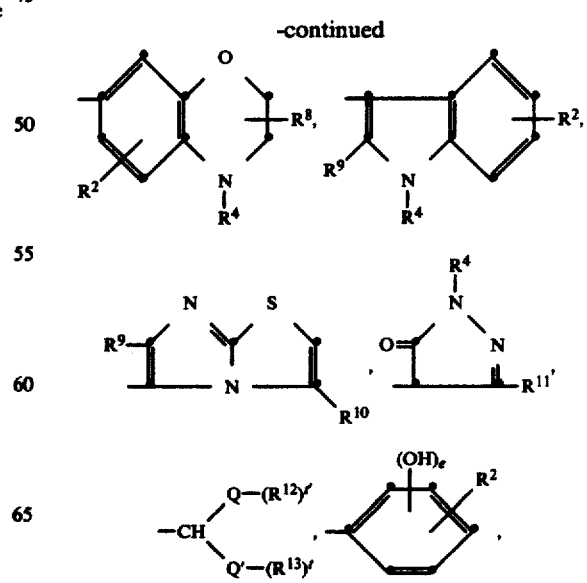

| R¹ | R¹⁶ | R¹⁷ | R² | R¹⁴ | M |
|---|---|---|---|---|---|
| H | C₆H₁₁ | H | H | H | K |
| H | C₂H₄CONH₂ | H | H | H | " |
| H | C₂H₄SO₂CH=CH₂ | H | H | 8-OH | " |
| CH₃ | C₂H₄NHSO₂CH₃ | H | H | H | Na |
| CH₃ | C₂H₄NH-CO-CH₃ | H | 3-OCH₃ | 8-OH | K |
| CH₃ | C₂H₄OC₂H₄OCH₃ | H | H | H | K |
| C₄H₉—n | CH(CH₃)C₂H₅ | H | H | H | Na |
| C₄H₉—n | CH(CH₃)CH₂CH(CH₃)CH₃ | H | H | H | Na |
| C₄H₉—n | C₆H₅ | C₂H₄OH | 2-OCH₃ | H | Na |
| C₄H₉—n | C₂H₅ | H | " | H | " |
| C₄H₉—n | CH₂CH(OH)CH₂OH | H | " | H | " |
| C₄H₉—n | C₂H₄SO₂NH₂ | H | " | " | " |
| C₄H₉—n | (CH₂)₆NHCOCH₃ | H | " | " | " |
| C₄H₉—n | C₂H₄OC₂H₄OH | H | H | H | K |
| C₂H₅ | CH₃ | H | H | " | Na |
| C₂H₅ | C₆H₁₁ | H | " | " | Na |
| C₂H₅ | C₂H₄CONH₂ | H | H | H | NH₄ |
| C₂H₅ | C₂H₄SO₂CH=CH₂ | H | H | 8-OCH₃ | K |
| C₂H₅ | CH₂—⟨furan⟩—COOC₂H₅ | H | 3-OC₂H₅ | K | |
| C₂H₅ | C₂H₄NH-CO-CH₃ | H | H | H | K |
| C₂H₅ | C₂H₄OC₂H₄OCH₃ | CH₃ | H | " | NH₄ |
| C₂H₅ | CH(CH₃)C₂H₅ | CH₃ | H | " | K |
| C₂H₅ | CH(CH₃)CH₂CH(CH₃)CH₃ | CH₃ | 3-C₂H₅ | " | " |
| C₂H₅ | C₆H₅ | C₂H₄OC₂H₅ | H | " | " |
| C₃H₇—n | C₂H₅ | " | H | " | " |

The invention has been described in detail with particular reference to certain preferred embodiments thereof, but it will be understood that variations and modifications can be effected within the spirit and scope of the invention.

We claim:

1. A dye of the formula:

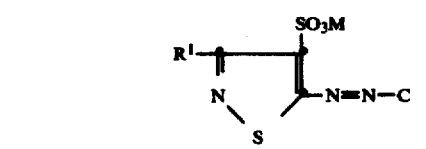

wherein R¹ is hydrogen or alkyl; M is H⁺, Na⁺, Li⁺, K⁺ or NH₄⁺; and C is a coupler selected from

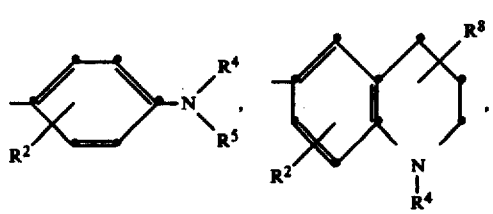

-continued

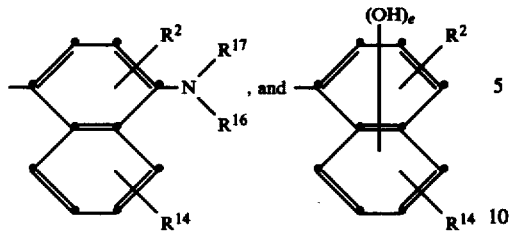

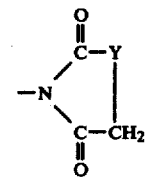

wherein $R^2$ and $R^{14}$ each independently represents hydrogen or 1–3 substituents selected from fluorine, chlorine, bromine, alkyl, cycloalkyl, alkoxy, phenoxy, alkylthio, arylthio, and radicals having the formula —NH—X—$R^3$ in which X is —CO—, —COO—, or —SO$_2$— and $R^3$ is selected from alkyl and alkyl substituted with halogen, hydroxy, phenoxy, aryl, cyano, cycloalkyl, alkylsulfonyl, alkylthio, alkanoyloxy, and alkoxy, and when X is —CO—, $R^3$ also is selected from hydrogen, amino, alkylamino, alkylcarbamoyl, dialkylamino, arylamino, aryl, and furyl;

$R^4$ and $R^5$ are each selected from hydrogen, alkyl, aryl, cycloalkyl, and $R^4$ and $R^5$ combined as —CH$_2$CH$_2$CH$_2$CH$_2$CH$_2$—, —CH$_2$CH$_2$OCH$_2$CH$_2$—, —CH$_2$CH$_2$—S—CH$_2$CH$_2$—, or —CH$_2$CH$_2$—SO$_2$—CH$_2$CH$_2$—;

$R^8$ is one or two groups each selected from hydrogen, alkyl and alkyl substituted with —CN, alkoxy, alkoxycarbonyl, alkoxycarbonyloxy, phenyl, cyclohexoxy, —OH, —Cl and Br;

$R^9$, $R^{10}$ and $R^{11}$ are each selected from hydrogen, alkyl, phenyl, phenyl substituted with 1–3 substituents selected from Cl, Br, alkyl and alkoxy, alkylthio, benzylthio, cyclohexylthio, and phenylthio;

Q and Q' are each selected from —CO—, —SO$_2$, and —CN;

$R^{12}$ and $R^{13}$ are each selected from hydrogen, alkyl, hydroxyalkyl, alkoxy, alkoxycarbonylamino, trifluoromethyl, phenyl, phenyl substituted with 1–3 substituents selected from Cl, Br, alkyl and alkoxy, alkoxycarbonylalkyl, cyanoalkyl, amino, haloalkyl, alkylamino, alkylthio, benzylthio, cyclohexylthio, phenylthio, and $R^{12}$ and $R^{13}$ combined as an alkylene bridge of 2 or 3 carbons or as an arylene or cycloalkylene radical of 5–6 carbons connecting Q and Q';

$R^{16}$ and $R^{17}$ are selected from hydrogen, cycloalkyl, aryl, alkyl, alkyl substituted with alkoxy, hydroxy, alkoxyalkoxy, hydroxyalkoxy, carbamoyl, sulfamoyl, acylamido, or alkylsulfonyl, and aryl substituted with hydroxyalkyl; e is 1 or 2; t and t' are each 1 or zero and when t or t' is zero, the corresponding Q or Q' group is —CN;

and wherein each of the aliphatic portions of the above alkyl, cycloaliphatic, alkoxy, alkanoyl, aryl and aryloxy groups are unsubstituted or substituted with 1–3 of the following: hydroxy; halogen; cyano; succinimido; glutarimido; phthalimido; 2-pyrrolidono; cyclohexyl; phenyl; phenyl substituted with alkyl, alkoxy, halogen, alkanoylamino, cyano or alkoxycarbonyl; alkanoylamino; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyl; alkoxycarbonyloxy;

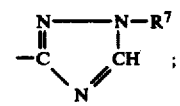

wherein Y is —NH—, —NH—alkyl—, —O—, —S—, or —CH$_2$O—; —S—$R^6$ wherein $R^6$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

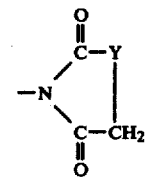

—O$XR^3$; —NH—X—$R^3$; —X—$R^3$; —CON$R^7R^7$; —SO$_2$N$R^7R^7$; wherein $R^3$ and X are as defined above and each $R^7$ is selected from H and $R^3$; alkoxy; alkoxy substituted with hydroxy, cyano, alkanoyloxy, or alkoxy; phenoxy or phenoxy substituted with one or more of alkyl, alkoxy or halogen.

2. The dye according to claim 1 having the formula

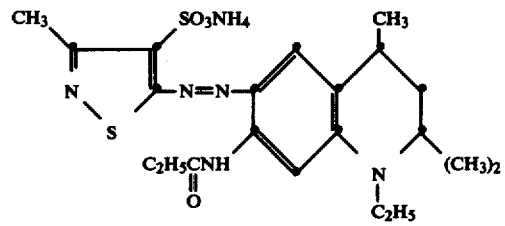

3. The dye according to claim 1 having the formula

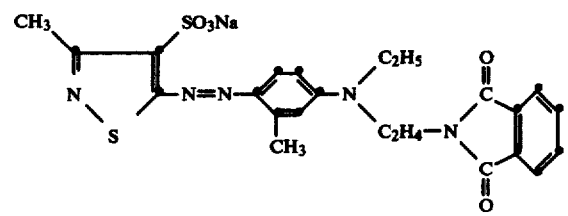

4. The dye according to claim 1 having the formula

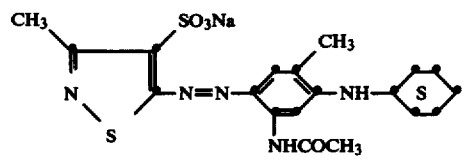

5. The dye according to claim 1 having the formula

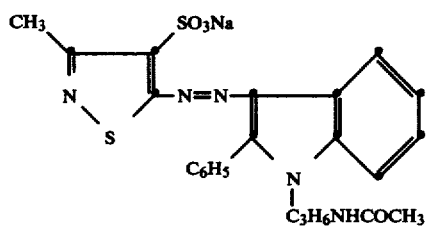

6. A dye according to claim 1 wherein C is a coupler of the formula

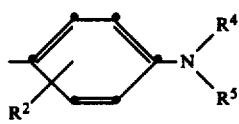

wherein $R^2$, $R^4$, and $R^5$ are as defined therein.

7. A dye according to claim 1 wherein C is a coupler of the formula

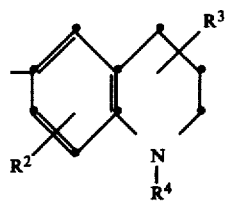

wherein $R^2$, $R^4$, and $R^8$ are as defined therein.

8. A dye according to claim 1 wherein C is a coupler of the formula

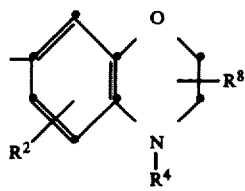

wherein $R^2$, $R^4$, and $R^8$ are as defined therein.

9. A dye according to claim 1 wherein C is a coupler of the formula

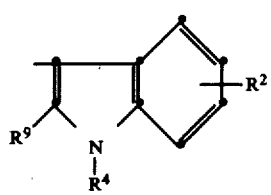

wherein $R^2$, $R^4$, and $R^9$ are as defined therein.

10. A dye according to claim 1 wherein C is a coupler of the formula

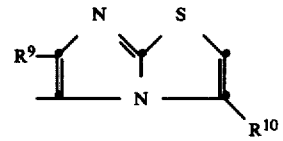

wherein $R^9$ and $R^{10}$ are as defined therein.

11. A dye according to claim 1 wherein C is a coupler of the formula

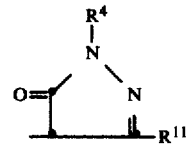

wherein $R^4$ and $R^{11}$ are as defined therein.

12. A dye according to claim 1 wherein C is a coupler of the formula

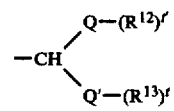

wherein Q, Q', t, t', $R^{12}$ and $R^{13}$ are as defined therein.

13. A dye according to claim 1 wherein C is a coupler of the formula

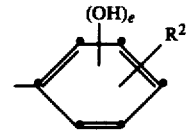

wherein e and $R^2$ are as defined therein.

14. A dye according to claim 1 wherein C is a coupler of the formula

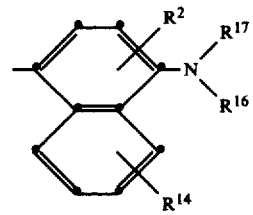

wherein $R^2$, $R^{14}$, $R^{16}$, and $R^{17}$ are as defined therein.

15. A dye according to claim 1 wherein C is a coupler of the formula

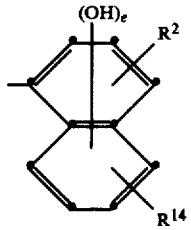

wherein e, $R^2$ and $R^{14}$ are as defined therein.

* * * * *

UNITED STATES PATENT AND TRADEMARK OFFICE
CERTIFICATE OF CORRECTION

PATENT NO. : 4,444,684
DATED : April 24, 1984
INVENTOR(S) : Max A. Weaver and Bill A. Eller It is certified that error appears in the above—identified patent and that said Letters Patent is hereby corrected as shown below:

On the title page:

In the title at [54] and Column 1, line 2, "5-AMINO ISOTHIAZOL" should read --- 5-AMINOISOTHIAZOL ---

Column 15, line 37, "-$SO_2$," should read --- -$SO_2$-, ---.

Column 15, line 57, after "alkoxy," insert --- and ---.

Column 15, line 57, after "alkanoyl," insert --- and the ---.

Column 17, in the structure at lines 26-35, "$R^3$" should read --- $R^8$ ---.

Signed and Sealed this

Eighth Day of January 1985

[SEAL]

Attest:

Attesting Officer

GERALD J. MOSSINGHOFF

*Commissioner of Patents and Trademarks*